United States Patent Office

3,391,081
Patented July 2, 1968

3,391,081
GELLED MINERAL OIL COMPOSITIONS
James A. Conrady, Amherst, Ohio, assignor to The B. F. Goodrich Company, New York, N.Y., a corporation of New York
No Drawing. Continuation-in-part of application Ser. No. 372,681, June 4, 1964. This application Jan. 17, 1967, Ser. No. 609,768
8 Claims. (Cl. 252—34.7)

ABSTRACT OF THE DISCLOSURE

Gelled mineral oil compositions are prepared by blending together mineral oil, a cross-linked polymer of acrylic acid, an aliphatic amine to neutralize the acrylic acid polymer, and a long chain alcohol. Dyes, pigments, perfumes and the like may be added to the gelled mineral oil compositions which are useful, for example, in printing inks, cosmetics and metal protecting formulations.

---

This application is a continuation-in-part of my co-pending application, Ser. No. 372,681, filed June 4, 1964 and now abandoned.

This invention relates to gelled mineral oil compositions and to the method by which they are produced. More particularly, the present invention is concerned with a gel comprised of a mineral oil, a crosslinked polymer of acrylic acid, an aliphatic amine neutralizing agent for said polymer, an alcohol having a long carbon chain, and a short chain alcohol.

Many industrial uses are known for gelled mineral oils, for example, in printing inks, cosmetics, pharmaceuticals, lubricants, and in metal protecting formulations. Heretofore, no operable recipe for preparing reproducible mineral oil gels using synthetic polymeric carboxylic thickeners has been devised. It is, therefore, the object of this invention to provide a smooth, transparent, homogeneous, stable mineral oil gel.

The composition of this invention is a gel derived from a unique mixture comprising, as essential ingredients, (A) 100 parts by weight of mineral oil, (B) from 1 to 10 parts by weight of a lightly crosslinked interpolymer of an alpha,beta-monoolefinically terminally unsaturated monocarboxylic acid having from 3 to 4 carbon atoms (i.e., acrylic and methacrylic acid) and a polyunsaturated compound copolymerizable with said acid and which has at least two alkenyl groups, (C) an aliphatic amine containing a carbon chain having at least 8 carbon atoms, in an amount which is at least sufficient to substantially neutralize the aforesaid acidic interpolymer, (D) from about 5 to about 100 parts by weight of a saturated aliphatic alcohol having from one to two carbon atoms, i.e., methanol or ethanol or mixtures thereof, referred to herein as the short chain alcohol, and (E) from about 5 to about 100 parts by weight of at least one aliphatic alcohol having from 4 to 22 carbon atoms in the chain, referred to herein as the long chain alcohol.

The several components comprising the gel are blended using a conventional mixing apparatus having a mixing chamber equipped with a low or medium shear agitator. The acrylic acid polymer, a fine powdery material, is uniformly dispersed in the mineral oil, the neutralizing amine is then admixed therewith, followed by the addition of the long chain alcohol. The gel is formed when the short chain alcohol is added to said mixture. The gels preferably are prepared in accordance with this invention at room temperature, although the ease of mixing may be facilitated by blending at elevated temperatures since viscosity of the blend decreases with increasing temperature; however, care must be taken when compounding at higher temperatures to prevent the loss of the volatile alcohol constituents from the mixing vessel.

In addition to the aforesaid essential constituents of the mineral oil gel, which constituents are defined with greater particularity hereinbelow, various other materials may be incorporated therein to give desired characteristics and properties to the product. For example, perfumes can be added to mask the unpleasant odors of the long chain alcohols and amines and to impart a pleasant scent to the gel. Dyes or pigments may be easily incorporated therein to provide colored gels.

The "mineral oils" comprising the base substance of the compositions of this invention are the oily liquids obtained by the distillation of that portion of petroleum which boils between about 330° C. and about 390° C., and, generally speaking are hydrocarbon oils which are insoluble in water, alcohol and glycerine and are soluble in ether, chloroform and benzene. The aforesaid petroleum distillate fraction can be subjected to a purification treatment with sulfuric acid and caustic soda, followed by filtration through decolorizing carbon and cooling and removal of crystallized waxes (solid paraffins) to provide the refined mineral oils (also known as "liquid petrolatums") which are colorless, tasteless and nearly odorless. Liquid petrolatums may be further classified under the designations: "light liquid petrolatum" having a specific gravity of 0.828 to 0.860 and a viscosity range at 100° F. of about 70 to 110 S.U.S.; and "heavy liquid petrolatum" with a specific gravity of 0.860 to 0.905 and a viscosity range at 100° F. of about 230 to 280 S.U.S. Representative, commercially available mineral oils are sold under the trademarks "Nujol," "Fractol," "Kaydol," "Drakeol," "Saxol," "Alboline," "Kremol," "Marcol," "Wyrol" and many others.

The synthetic resins used as the thickening agents in the gels embodied herein are the lightly crosslinked interpolymers of acrylic or methacrylic acid, or mixtures of said acids, with a polyunsaturated compound having a plurality of terminally unsaturated polymerizable groups. Said polymeric thickeners are hereinafter sometimes referred to as "acrylic acid polymers" or "acrylic acid interpolymers" for purposes of brevity. They are copolymers of said acrylic acids with a minor amount, e.g., about 0.5 to about 2.5% by weight, preferably 0.5 to 2.0% by weight, of the polyunsaturated crosslinking monomer, said percent based on the weight of the copolymer. The copolymerization of the monomers ordinarily is carried out in an inert hydrocarbon diluent using a free-radical catalyst. The crosslinked acrylic acid polymers are recovered from the polymerization media as white powders. They are high molecular weight resins, e.g., generally having a molecular weight greater than about 200,000, preferably greater than about 2,000,000 and usually in the range of about 3,000,000. Such acrylic acid polymers and their sodium, ammonium and amine salts are characterized by being insoluble in water and in aliphatic and aromatic hydrocarbons; however, they are water-swellable and a small amount thereof can thicken water into a heavy mucilage or gel; moreover, the copolymers and their salts are solvent-sensitive and can thicken non-polar solvents under certain conditions, but with comparatively less effectiveness than in the thickening of water. The mineral oil gels embodied herein are characterized by being substantially free of water since mineral oil and water are generally incompatible.

Representative polyunsaturated compounds which may be copolymerized with acrylic or methacrylic acid in minor amounts to provide the lightly crosslinked acrylic acid polymers are the vinyl, allyl and methallyl ethers of polyhydric alcohols having at least four carbon atoms and at least three alcoholic hydroxyl groups. The preferred polyalkenyl polyether monomers are polyallyl sucrose and polyallyl pentaerythritol, desirably containing an average of at least 3 allyl groups for each molecule of sucrose or pentaerythritol, the allyl groups attached thereto by means of ether linkages. The preferred polyallyl sucrose contains an average of 5 to 6 allyl groups per molecule of sucrose (theoretical maximum is 8 allyl groups) and the preferred polyallyl pentaerythritol contains 4 allyl ether groups per molecule (the theoretical maximum). Acrylic acid copolymers employing crosslinking monomers of the aforesaid type are described in U.S. Patent No. 2,798,053. Other polyunsaturated compounds that can be employed to prepare the acrylic acid copolymer additives are the polymeric benzene-soluble products resulting from Na or K polymerization of di-olefins, preferably conjugated dienes. These polymers have a very large proportion of 1,2 structure in the chain and consequently have a plurality of $CH_2=$ side groups which can be copolymerized with the acrylic acids. Acrylic acid interpolymers containing this type of crosslinking agent are described in U.S. Patent 2,858,281. Other crosslinking agents that can be copolymerized with acrylic and methacrylic acid are the polyallyl or polymethallyl trimethylene trisulfones. These monomers are described in U.S. Patents 2,535,533 and 2,535,534 and the acrylic acid copolymers are described in U.S. Patent 2,958,679. Still other crosslinking agents that can be employed in producing the acrylic acid copolymers are the polyvinyl, poly allyl or polymethallyl silanes or the corresponding tin compounds. In these compounds the silicon or tin atom is connected to a carbon atom by a covalent bond. The silicon or tin compound, of course, must have at least two of the unsaturated groups mentioned above. Particularly good crosslinked polymers can be prepared by copolymerizing tetrallyl or tetravinyl silane or tin with the acrylic acids. However, satisfactory copolymers can be produced with tin compounds having two or three of the groups, vinyl, allyl or methallyl. The remainder of the silicon or tin atom can have any nontoxic group and particularly an alkyl group. The acrylic acid copolymers made with the polyallyl or polyvinylsilane or tin compounds are described in U.S. Patent 2,985,631. Still another crosslinked acrylic acid polymer suitable as a thickener for the gels of this invention are the copolymers of acrylic or methacrylic acid with small amounts of a polyallyl phosphate ester as the crosslinking agent, said copolymers being described in the copending U.S. Patent application of Frank A. Wagner, Ser. No. 425,338 filed Jan. 13, 1965. The allyl phosphates embodied therein conform to the formula

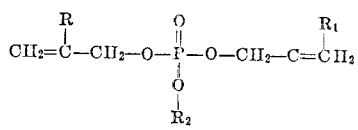

where R and $R_1$ are independently selected from the group consisting of a hydrogen atom and a methyl radical, and $R_2$ is selected from the group consisting of a hydrogen atom, an allyl radical, a methallyl radical, an alkyl radical, an aralkyl radical, an aryl radical and an alkaryl radical. From this class of monomers triallyl phosphate is preferred.

The mixtures of this invention contain at least about one part of crosslinked acrylic acid polymer per 100 parts by weight of mineral oil and no practical advantage in increased thickening is gained by using more than about 10 parts of the resin per 100 parts of mineral oil. The preferred range is from about 3 to 5 parts of polymer per 100 parts of oil.

The acrylic acid polymer is uniformly dispersed in the oil and then converted to an amine salt by adding to the mixture a saturated or unsaturated aliphatic amine, or mixtures of said aliphatic amines, said amine containing at least one carbon chain having at least 8 carbon atoms attached to the amine nitrogen atom. Preferred, however, are carbon chains having from 10 to 22 carbon atoms. Suitable amine neutralizing agents thus include the higher aliphatic primary, secondary and tertiary amines derived from fatty acids and mixtures thereof (i.e., the fatty amines). A comprehensive survey of fatty acids from which such amines are derived is found in the "Encyclopedia of Chemical Technology" by Kirk and Othmer, John Wiley and Sons, Inc., New York, N.Y., volume 6 (1951), pp. 173–178. Fatty amines are described in detail on pp. 127–135 of the "Encyclopedia of Chemical Technology," Second Edition, volume 2 (1963). Representative amines are the octyl, dodecyl, tetradecyl, hexadecyl, octadecyl, arachic, lauroleic, myristoleic, palmitoleic, oleic, erucic, linoleic, eleostearic, linolenic, didodecyl, ditetradecyl, dioctadecyl, dicoco, di(octadecenyloctadecadienyl), trioctyl, tridodecyl, and tricoco amines and the like and mixtures thereof. Most preferred herein are the primary, secondary and tertiary amines possessing one or more aliphatic chains having from 12 to 18 carbon atoms and mixtures thereof.

The amine is admixed with the oil and resin in an amount which is at least sufficient to substantially neutralize the acrylic acid polymer. This amount is easily determined by simple calculations involving the equivalent weights thereof. However, it has been found that the use of excess amine, for example, from about 2 to about 5 times that required to neutralize the acrylic acid polymer, results in clearer, higher viscosity gels. The preferred ratio is about 2 to 3 equivalents of amine per equivalent of acrylic acid polymer.

The compositions prepared according to this invention contain, per 100 parts by weight of mineral oil, from about 5 to about 100 parts, preferably from about 5 to about 20 parts, of a lower aliphatic, saturated alcohol selected from the group consisting of methanol, ethanol and mixtures thereof. It has been found that the compositions must also contain in admixture one or more long chain aliphatic alcohols, that is, alcohols which have at least 4 carbon atoms. Although alcohols containing up to 22 carbon atoms are operable, those having 8 to 18 carbon atoms are preferred. The amount of long chain alcohol required in the blends ranges from about 5 to about 100 parts, and preferably from about 10 to about 40 parts, based on 100 parts of mineral oil. Representative alcohols in the so-called "long-chain" alcohol category referred to herein are the saturated primary, secondary and tertiary alcohols having at least 4 carbon atoms such as the butanols, the amyl alcohols, the hexanols, the heptanols, the octanols, nonyl alcohol, decanol, dodecanol, tetradecanol, cetyl alcohol, octadecanol, and the like and mixtures thereof; and the ethylenically unsaturated alcohols having at least 4 carbon atoms and from one to three olefinic bonds in the carbon chain, such as lauroleyl alcohol, myristoleyl alcohol, palmitoleyl alcohol, oleyl alcohol, erucyl alcohol, linoleyl alcohol, linoleneyl alcohol, and the like and mixtures thereof.

Smooth, homogeneous and stable mineral oil gels will not be obtained unless the aforedescribed multi-alcohol system is utilized in compounding the blends. By the term "stable gel" is meant one which will not separate into layers of the several components incorporated therein immediately or even after long storage periods. The gels prepared according to this invention are stable for at least six months and frequently for an indefinite period. Homogenous gels can be prepared within a wide range of viscosities, ranging from thin pourable gels with a viscosity of about 100 centipoise at 25° C. to thick rubbery gels of greater than 200,000 centipoise viscosity. The viscosity of the gel product is a function of the amount of acrylic acid polymer used, the amount and type of amine, and the long chain alcohol used. In general, the longer the carbon chain of the amine used as the neutralizing agent, the higher the viscosity of the resulting gel.

EXAMPLES

In the illustrative embodiments set forth hereinbelow, the following materials identified by trademark designation were employed:

Mineral oils

"Kaydol L-1" and "Kaydol L-16": clear, white, refined liquid petrolatum having an A.P.I. gravity of 27.4 to 29.3 and a Saybolt Viscosity at 100° C. of 345 to 355. The "Kaydol" mineral oils are sold by L. Sonneborn Sons, Inc., Chicago, Illinois.

"Drakeol 19": a refined, clear liquid petrolatum having a specific gravity of 0.864 to 0.873 at 77° F., and a viscosity of 185 SSU at 100° F. and 44.5 SSU at 210° F.

"Drakeol 35": a refined, colorless liquid petrolatum having a specific gravity of 0.875 to 0.883 at 77° F., and a viscosity of 360 SSU at 100° F. and 54 SSU at 210° F.

The "Drakeol" mineral oils are sold by the Pennsylvania Refining Company, Butler, Pennsylvania.

"Rocket H" and "Certrex 56": tan-colored, partially-refined mineral oils sold by the Socony Mobil Oil Company, Inc.

Acrylic acid copolymers

"Copolymer A": copolymer of acrylic acid and about 1% by weight of a polyallyl ether of sucrose having an average of about 5.8 allyl groups per each sucrose molecule.

"Copolymer B": a copolymer of acrylic acid and about 1% by weight of the polyallyl ether of pentaerythritol (tetraallyl pentaerythritol).

"Copolymer C": a copolymer of acrylic acid and approximately 0.5% by weight of the polyallyl ether of pentaerythritol.

Neutralizing amines

"Armeen CD": a mixture of fatty amines having a molecular combining weight (equivalent weight) within the range of about 185 to 206, derived from coconut oil fatty acids (a mixture of fatty acids having from 8 to 18 carbon atoms).

"Armeen 12D": a mixture of fatty amines derived from a mixture of fatty acids having 10 to 14 carbon atoms.

"Armeen 18D": a mixture of fatty amines derived from a mixture of fatty acids having 16 to 18 carbon atoms. The "Armeen" fatty acid amines, sold by Armour and Co., Chicago, Illinois, are described on page 62 of the "Handbook of Material Trade Names" by Zimmerman and Lavine, Industrial Research Service, Dover, N.H., (1953).

The mixtures described in the examples set forth hereinbelow were prepared at room temperature in the following manner. The powdery acrylic acid polymer was dispersed in the mineral oil using an air driven propeller stirrer. The neutralizing amine was then slowly added with continuous stirring, followed by a rapid addition of the long chain alcohol. The short chain alcohol was then added thereto and the mixture was given a short period of agitation. If the composition met the requirements of this invention, there was a viscosity increase and subsequent gel formation. Viscosity of the products was measured at 25° C. using a Brookfield Model RVT Viscometer. Amounts of ingredients specified in the examples are given in parts by weight.

EXAMPLE I

In this series of experiments summarized in Table A below, various formulations not conforming to the requirements for mixtures within the scope of the invention (i.e., with regard to the alcohol components) failed to give the desired homogeneous mineral oil gel. When a condition of "No Gel" is reported in the summary of results, it was usually observed that the acrylic acid polymer precipitated from the mixture of oil and alcohols as a rubbery mass, or in a few cases there was no appreciable thickening of the blend. When the alcohol component consisted solely of methanol, ethanol or isopropanol, no gel was formed or there was a light gel which separated into layers; the use of a sole alcohol containing 4 or 5 carbon atoms resulted in merely a slightly thickened mixture or a light non-uniform gel. Various combinations of alcohols which were not in accordance with the requirements of this invention also gave unsatisfactory results as shown in the table.

TABLE A

| Ex. No. | Mineral Oil (100 parts) | Acrylic Acid Polymer [1] (Copolymer A), parts | Amine [2] ("Armeen CD"), parts | Ratio of Equivalents of Amine to Equivalents of Acrylic Acid Polymer | Alcohol (parts) | Alcohol (parts) | Viscosity of Gel in centipoises and Remarks |
|---|---|---|---|---|---|---|---|
| 1 | "Kaydol L-1" | 4.3 | 8.6 | 0.7/1 | Methanol (10) | | No Gel. |
| 2 | do | 5 | 20 | 1.5/1 | do | | Do. |
| 3 | do | 5 | 15 | 1.1/1 | Methanol (50) | | Do. |
| 4 | do | 5 | 15 | 1.1/1 | Methanol (100) | | Do. |
| 5 | do | 5 | 30 | 2.3/1 | Methanol (10) | | Do. |
| 6 | do | 5 | 45 | 3.4/1 | do | | Do. |
| 7 | do | 5 | 55 | 4.1/1 | do | | Do. |
| 8 | do | 5 | 20 | 1.5/1 | Ethanol (30) | | 4,200; separation of components. |
| 9 | do | 5 | 20 | 1.5/1 | Ethanol (10) | Isopropanol (20) | 7,500; separation of components. |
| 10 | do | 5 | 20 | 1.5/1 | Isopropanol (18) | | No Gel. |
| 11 | do | 5 | 20 | 1.5/1 | Isopropanol (10) | Isooctanol (20) | Do. |
| 12 | do | 5 | 20 | 1.5/1 | n-Butanol (20) | | 10,000; separation of components. |
| 13 | "Drakeol 19" | 5 | 20 | 1.5/1 | Ethanol (10) | Isopropanol (20) | 6,250; separation of components. |
| 14 | do | 5 | 20 | 1.5/1 | Amyl alcohol (20) | | 575. |
| 15 | do | 5 | 20 | 1.5/1 | Ethanol (10) | Allyl alcohol (20) | 9,770; separation of components. |

[1] Equivalent weight of about 75.  [2] Equivalent weight of about 185 to 206.

EXAMPLE II

In this comprehensive series of experiments, transparent gels within a wide range of viscosities were prepared in accordance with the present invention by blending 100 parts of a representative mineral oil with variable amounts of a representative acrylic acid polymer, a suitable neutralizing amine, a long chain alcohol, and variable amounts of methanol or ethanol or a mixture of the two. The data are tabulated in Table B.

TABLE B

| Ex. No. | Mineral oil, 100 parts | Acrylic Acid Polymer,[1] 5 parts except where otherwise indicated | Amine[2] ("Armeen CD") parts | Ratio of Equivalent Amine to Equivalent Polymer | Alcohol, 10 parts except where otherwise indicated | Alcohol (parts) | Viscosity of Gel in Centipoises |
|---|---|---|---|---|---|---|---|
| 16 | "Kaydol L-1" | Copolymer A, 3 parts | 27 | 2/1 | Methanol | Iso-octanol (40) | 13,000 |
| 17 | do | do | 45 | 3.4/1 | do | do | 34,000 |
| 18 | do | do | 20 | 1.5/1 | do | do | 114,000 |
| 19 | do | do | 20 | 1.5/1 | do | Iso-octanol (20) | 52,000 |
| 20 | do | do | 20 | 1.5/1 | do | do | 102,000 |
| 21 | do | Copolymer B | 4.2 | 0.5/1 | do | do | [3] 450 |
| 22 | do | do | 12.3 | 1/1 | do | do | 49,000 |
| 23 | do | Copolymer C | 24.6 | 2/1 | do | do | 82,000 |
| 24 | do | do | 36.9 | 3/1 | do | do | 124,000 |
| 25 | do | Copolymer B | 24.6 | 2/1 | do | do | 116,000 |
| 26 | do | do | 36.9 | 3/1 | do | do | 120,000 |
| 27 | do | do | 12.3 | 1/1 | do | Iso-octanol (40) | 114,000 |
| 28 | do | Copolymer A | 20 | 1.5/1 | Ethanol | Iso-octanol (20) | 57,000 |
| 29 | "Rocket H" | do | 20 | 1.5/1 | Methanol | do | 78,000 |
| 30 | "Certrex 56" | do | 20 | 1.5/1 | do | do | 131,000 |
| 31 | "Kaydol L-1" | Copolymer B, 3 parts | 32 | 4/1 | Ethanol, 6 parts | Iso-octanol (24) | 13,600 |
| 32 | do | do | 20 | 1.5/1 | do | do | 74,000 |
| 33 | do | do | 20 | 1.5/1 | do | Iso-octanol (40) | 110,000 |
| 34 | do | Copolymer A | 20 | 1.5/1 | Ethanol | n-Butanol (20) | 28,250 |
| 35 | do | do | 20 | 1.5/1 | do | Iso-butanol (20) | 28,000 |
| 36 | do | do | 20 | 1.5/1 | do | Amyl alcohol (20) | 59,000 |
| 37 | do | do | 20 | 1.5/1 | do | Octanol (20) | 88,000 |
| 38 | do | do | 20 | 1.5/1 | do | Decanol (20) | 100,000 |
| 39 | do | do | 20 | 1.5/1 | do | Duodecanol (20) | [4] |
| 40 | "Drakeol 19" | do | 20 | 1.5/1 | do | n-Butanol (20) | 44,600 |
| 41 | do | do | 20 | 1.5/1 | do | Iso-butanol (20) | 48,000 |
| 42 | do | do | 20 | 1.5/1 | do | Amyl alcohol (20) | 55,000 |
| 43 | do | do | 20 | 1.5/1 | do | Iso-amyl alcohol (20) | 55,000 |
| 44 | do | do | 20 | 1.5/1 | do | Hexanol (20) | 68,400 |
| 45 | do | do | 20 | 1.5/1 | do | Heptanol (20) | 82,000 |
| 46 | do | do | 20 | 1.5/1 | do | Octanol (20) | 88,000 |
| 47 | do | do | 20 | 1.5/1 | do | Iso-octanol (20) | 95,000 |
| 48 | do | do | 20 | 1.5/1 | do | Decanol (20) | 105,000 |
| 49 | do | do | 20 | 1.5/1 | do | Duodecanol (20) | 132,000 |
| 50 | do | do | 20 | 1.5/1 | Ethanol (10) and methanol (10) | Iso-octanol (40) | 44,000 |
| 51 | "Drakeol 35" | do | 20 | 1.5/1 | Ethanol | Iso-octanol (20) | 61,000 |
| 52 | do | do | 40 | 3/1 | do | Iso-octanol (40) | 115,000 |
| 53 | do | do | 20 | 1.5/1 | do | do | 77,000 |
| 54 | do | Copolymer B | 20 | 1.5/1 | do | do | 110,000 |
| 55 | do | Copolymer C | 20 | 1.5/1 | do | do | >200,000 |
| 56 | "Kaydol L-16" | Copolymer B | 20 | 1.5/1 | Ethanol (10) and methanol (10) | do | 113,000 |
| 57 | "Kaydol L-1" | do | [5] 36 | 1.9/1 | Methanol | Iso-octanol (20) | >200,000 |
| 58 | do | do | [6] 24.5 | 1.9/1 | do | do | 64,000 |
| 59 | do | do | [7] 36 | 2/1 | do | do | >200,000 |

[1] Equivalent weight of about 75.
[2] Equivalent weight of about 185 to 206.
[3] No gel (insufficient amine).
[4] Very thick gel, viscosity not measured.
[5] "Armeen 18D" (equivalent weight of about 280).
[6] "Armeen 12D" (equivalent weight of about 195).
[7] Oleylamine.

EXAMPLE III

The tests set forth in this example illustrate the epecificity of the type of amine neutralizing agent suitable for the compositions of this invention. The mixtures consisted of 100 parts of "Kaydol L-1" mineral oil, 5 parts of "Copolymer B" acrylic acid polymer, the specified amine in an amount such that the ratio of equivalent of amine to equivalent of acrylic acid polymer was about 2 to 1, 20 parts of iso-octanol and 10 parts of methanol. The data are presented in Table C. No satisfactory homogeneous gel was formed with any of the mixtures of this example. Either the acrylic acid polymeramine salt precipitated from the mixture of oil and alcohols as a rubbery mass, or the polymer was seen as a flocculated mass, or there was formed a light gel which separated into layers.

TABLE C

| Ex. No. | Amine | Characteristics of Mixture |
|---|---|---|
| 60 | Mixed isopropanol amine | Precipitation. |
| 61 | Diethanol amine | Flocculation. |
| 62 | Triethanol amine | Precipitation. |
| 63 | Dibutyl amine | Do. |
| 64 | Bis(1-ethyl, 3-methylpentyl)amine | Do. |
| 65 | Dicyclohexyl amine | Flocculation. |
| 66 | 2(2-amino ethoxy)ethanol amine | Precipitation. |
| 67 | Di-2-ethyl hexyl amine | Do. |
| 68 | Benzyl amine | Do. |
| 69 | N-aminoethyl piperazine | Separation. |

It is to be understood that the foregoing examples of specific embodiments of the invention are merely illustrative and not limiting since modifications and variations may be made without departing from the scope and spirit of the invention as defined by the appended claims. Stated differently, the essence of invention resides in the formation of a gelled mineral oil composition comprising a blend of mineral oil with an amine-neutralized, crosslinked acrylic acid polymer, and a plurality of alcohols. The addition of other materials and substances to the composition to provide diverse desirable properties and characteristics thereto is of course contemplated to be within the ambit of the invention.

I claim:

1. A gelled mineral oil composition comprising a mixture of
   (A) 100 parts by weight of mineral oil,
   (B) from about 1 to about 10 parts by weight of a crosslinked interpolymer of an alpha, beta-monoolefinically terminally unsaturated monocarboxylic acid having from 3 to 4 carbon atoms and a polyunsaturated compound selected from the group consisting of ethers, hydrocarbons, sulfones, silanes and corresponding tin compounds, and phosphates having at least two alkenyl groups and copolymerizable with said acid,
   (C) an aliphatic amine having at least one carbon chain containing at least 8 carbon atoms attached to the amine nitrogen atom, said amine present in an amount which is at least sufficient to substantially neutralize the aforesaid acidic interpolymer,
   (D) from about 5 to about 100 parts by weight of aliphatic alcohol having from 4 to 22 carbon atoms, and
   (E) from about 5 to about 100 parts by weight of an alcohol selected from the group consisting of methanol, ethanol and mixtures thereof.

2. The gelled mineral oil composition of claim 1 wherein (C) is an amine selected from the group consisting of aliphatic primary, secondary and tertiary amines and mixtures thereof, having a carbon chain attached to the amine nitrogen atom containing from 8 to 22 carbon atoms, said amine present in an amount which is at least sufficient to substantially neutralize the aforesaid interpolymer, and (D) is an aliphatic alcohol having from 8 to 18 carbon atoms.

3. The composition according to claim 2 wherein component (B) is an interpolymer of acrylic acid and said polyunsaturated compound, and component (C) is from about 1 to about 5 equivalents, per equivalent of acrylic acid interpolymer, of aliphatic primary amine.

4. The composition according to claim 3 wherein there is from about 3 to about 5 parts by weight of component (B), from about 10 to about 40 parts of component (D) and from about 5 to about 20 parts of component (E).

5. A gelled mineral oil composition of claim 1 wherein (B) is a crosslinked interpolymer of acrylic acid and about 0.5 to about 2.5%, based on the weight of the interpolymer, of a polyunsaturated compound having at least two alkenyl groups and copolymerizable with acrylic acid, (C) is present in amounts from about 2 to about 3 equivalents, per equivalent of the aforesaid acrylic acid interpolymer, and is an amine selected from the group consisting of aliphatic primary, secondary and tertiary amines and mixtures thereof, said amine having a carbon chain containing from 8 to 18 carbon atoms attached to the amine nitrogen atom, (D) is present in amounts of from about 10 to about 40 parts by weight and is an aliphatic alcohol having from 8 to 18 carbon atoms, and (E) is present in amounts of from about 5 to about 20 parts.

6. The composition according to claim 5 wherein there is from about 3 to about 5 parts of the interpolymer of acrylic acid and the aliphatic amine is a primary amine.

7. A method of gelling mineral oil which comprises the steps of (a) uniformly dispersing in 100 parts by weight of mineral oil from about 1 to about 10 parts by weight of a powdery crosslinked interpolymer of an alpha, beta-monoolefinically terminally unsaturated monocarboxylic acid having from 3 to 4 carbon atoms and a polyunsaturated compound selected from the group consisting of ethers, hydrocarbons, sulfones, silanes and corresponding tin compounds, and phosphates having at least two alkenyl groups and copolymerizable with said acid, (b) mixing therewith an aliphatic amine having at least one carbon chain containing at least 8 carbon atoms attached to the amine nitrogen atom, said amine being added in an amount which is at least sufficient to substantially neutralize the aforesaid acidic interpolymer, (c) mixing therewith from about 5 to about 100 parts by weight of aliphatic alcohol having from 4 to 22 carbon atoms, and (d) mixing therewith from about 5 to about 100 parts by weight of an alcohol selected from the group consisting of methanol, ethanol and mixtures thereof.

8. The method of claim 7 wherein, in (a) the crosslinked interpolymer is an interpolymer of acrylic acid and about 0.5 to about 2.5%, based on the weight of the interpolymer, of a polyunsaturated compound having at least two alkenyl groups and copolymerizable with acrylic acid, (b) from about 2 to about 3 equivalents, per equivalent of the aforesaid acrylic acid interpolymer, of amine selected from the group consisting of aliphatic primary, secondary and tertiary amines and mixtures thereof, said amine having a carbon chain containing from 8 to 18 carbon atoms attached to the amine nitrogen atom, and mixed with (a), (c) there is about 10 to about 40 parts by weight of aliphatic alcohol having from 8 to 18 carbon atoms, and in (d) there is about 5 to about 20 parts of an alcohol.

References Cited

UNITED STATES PATENTS

| | | | |
|---|---|---|---|
| 2,652,363 | 9/1953 | Woods et al. | 252—34.7 |
| 2,923,692 | 2/1960 | Ackerman et al. | 260—2.2 |
| 3,148,958 | 9/1964 | Monick | 44—7 |
| 3,226,373 | 12/1965 | Fareri | 252—34 |

DANIEL E. WYMAN, *Primary Examiner.*

I. VAUGHN, *Assistant Examiner.*